United States Patent
Sung

(10) Patent No.: US 7,443,501 B2
(45) Date of Patent: Oct. 28, 2008

(54) LIGHT GUIDE PLATE MEASUREMENT APPARATUS

(75) Inventor: Chang-Chih Sung, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1127 days.

(21) Appl. No.: 10/726,237

(22) Filed: Dec. 1, 2003

(65) Prior Publication Data
US 2004/0109158 A1 Jun. 10, 2004

(30) Foreign Application Priority Data
Nov. 29, 2002 (TW) .............................. 91134736 A

(51) Int. Cl.
G01N 21/01 (2006.01)
(52) U.S. Cl. .................................................... 356/244
(58) Field of Classification Search ........................ None
See application file for complete search history.

(56) References Cited

U.S. PATENT DOCUMENTS

| | | | | |
|---|---|---|---|---|
| 5,764,209 A * | 6/1998 | Hawthorne et al. | ............ | 345/87 |
| 5,801,545 A * | 9/1998 | Takekoshi et al. | ............ | 324/770 |
| 6,246,253 B1* | 6/2001 | Kang et al. | .................. | 324/770 |
| 6,486,927 B1* | 11/2002 | Kim | .............................. | 349/1 |
| 2001/0002862 A1* | 6/2001 | Okahira et al. | ........... | 356/237.1 |
| 2002/0057429 A1* | 5/2002 | Okahira et al. | ........... | 356/239.7 |
| 2002/0135395 A1* | 9/2002 | Smith et al. | .................. | 324/770 |
| 2003/0218145 A1* | 11/2003 | Tanabe | .................. | 250/559.45 |
| 2004/0012776 A1* | 1/2004 | Bae | .......................... | 356/237.4 |

\* cited by examiner

Primary Examiner—Michael P Stafira
(74) Attorney, Agent, or Firm—Wei Te Chung

(57) ABSTRACT

A light guide plate measurement apparatus (1) has a setting frame (2), a base plate (5), a controlling device (9), and a light source fixing device (6). The setting frame has sidewalls (21) and a cavity (23). The controlling device has a first axis adjustment device (3) and a second axis adjustment device (4). The two adjustment devices have a first arm (31) and a second arm (41) respectively, for moving the base plate. Each arm has a bulge (not labeled), which is received in a respective groove (not labeled) of the base plate. The fixing device has a light source space (61) and a shaft (7). The space has an opening (not labeled) at an extremity adjacent to the base plate. The shaft is disposed in a length of the fixing device, and serves as an axle that the fixing device can rotate about.

10 Claims, 3 Drawing Sheets

LIGHT GUIDE PLATE MEASUREMENT APPARATUS

BACKGROUND OF THE INVENTION

1. Field of the Invention

The present invention relates to precision measurement apparatuses, and particularly to a measurement apparatus used for a light guide plate.

2. Description of Related Art

With the rapid development of liquid crystal displays (LCDs), the light guide plate, as one of the key components of an LCD, has also undergone great development. For assuring good quality, measurement apparatuses are used in many of the stages of manufacturing of the light guide plate.

A conventional measurement apparatus comprises a setting frame, a light source fixing device, and a base plate for the placement thereon of a light guide plate to be measured. The light source fixing device and the base plate are both disposed on the setting frame opposite to each other. The base plate can move on the setting frame along a single axis, so as to change the horizontal distance between the light source fixing device and the base plate. In use, a light source contained in the light source fixing device emits light to illuminate the light guide plate on the base plate. Optical instruments are disposed at the side of a light emitting surface of the light guide plate to collect the measurement data.

Since the light source fixing device is fixed on the setting frame, the light guide plate and the light source fixing device are in a same plane. Therefore the measurement apparatus cannot imitate the condition of oblique incidence of light; that is, light received from a source which is not in the plane defined by the light guide plate. In addition, the base plate can only be moved along a single axis. Therefore the measurement apparatus cannot imitate the condition of deviation; that is, light received from a source which is in the same plane as that of the light guide plate but which is not aligned therewith. As a result, the measurements are limited in scope, and do not necessarily indicate the performance of the tested light guide plate under various circumstances.

It is desired to provide a measurement apparatus for a light guide plate which overcomes the above-described problems.

SUMMARY OF THE INVENTION

An object of the present invention is to provide a measurement apparatus for a light guide plate which can imitate various illumination circumstances for the light guide plate.

A measurement apparatus for a light guide plate of the present invention comprises a setting frame, a controlling device and a light source fixing device comprising a light source space for receive a light source and a shaft. The light source fixing device connects with the setting frame through the shaft, and can rotate about the shaft.

A key feature of the light source fixing device is that, unlike prior art, the shaft not only provides a connection means but also an axle that the light source fixing device can turn about. Therefore, conditions of different angles of incidence can be imitated.

Other objects, advantages, and novel features of the present invention will become more apparent from the following detailed description when taken in conjunction with the accompanying drawings; in which:

DETAILED DESCRIPTION OF THE INVENTION

Figure 1:
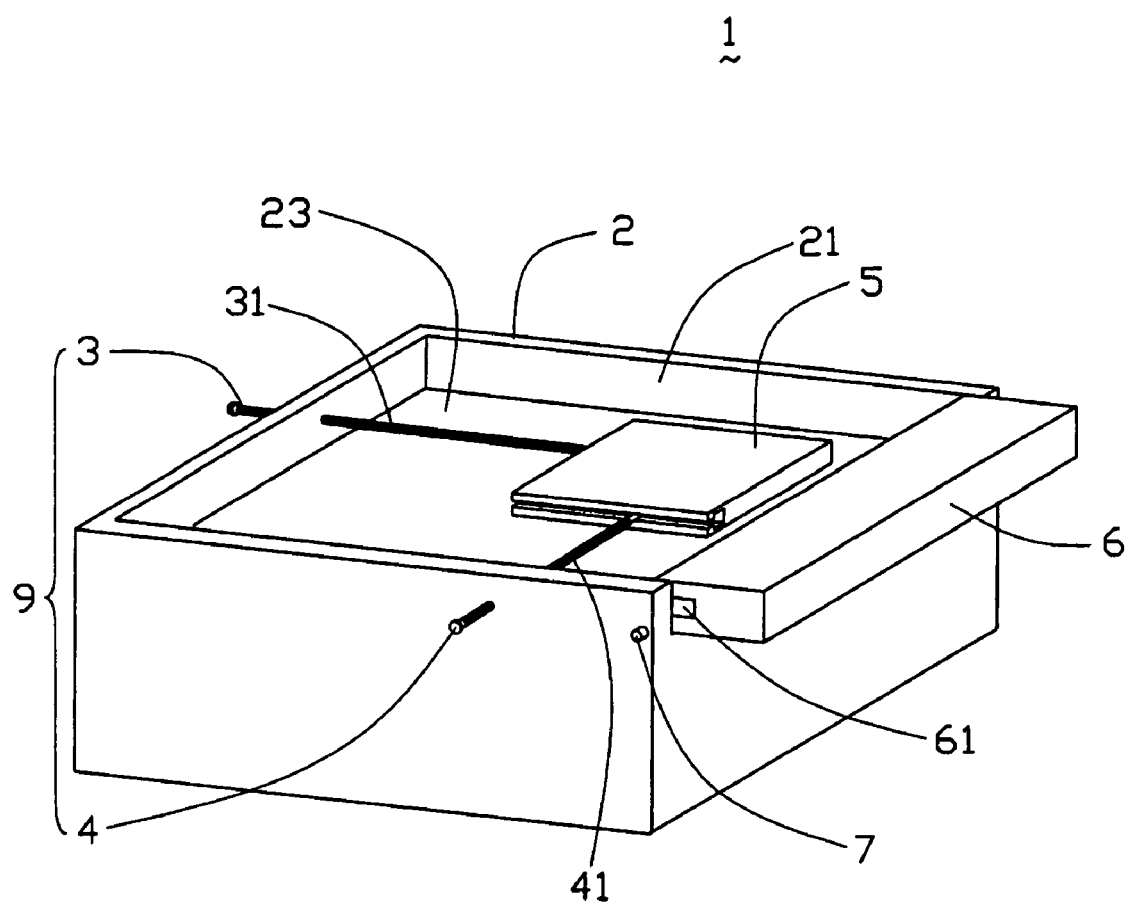
FIG. 1 is an isometric view of a light guide plate measurement apparatus according to a first embodiment of the present invention.

Referring to FIG. 1, a light guide plate measurement apparatus 1 according to the first embodiment of the present invention comprises a setting frame 2, a base plate 5 for placement thereon of the light guide plate to be tested, a controlling device 9 for moving the base plate 5, and a light source fixing device 6 disposed at a side of the setting frame 2. The light source fixing device 6 contains a light source.

The setting frame 2 comprises four side walls 21, and a cavity 23 cooperatively defined by the side walls 21. The base plate 5 is located in the cavity 23, and can be moved along two mutually perpendicular axes by operating the controlling device 9. In particular, the controlling device 9 has a first axis adjustment device 3 and a second axis adjustment device 4. The two adjustment devices 3, 4 comprise a first arm 31 and a second arm 41 respectively for moving the base plate 5. The two arms 31, 41 are disposed perpendicular to each other, and cross through corresponding sidewalls 21 to enable convenient operation. Each arm 31, 41 has a bulge (not labeled), which is received in a corresponding one of two grooves (not labeled) defined in two adjacent sides of the base plate 5.

When the first axis adjustment device 3 is rotated, the arm 31 moves the base plate 5 to change a distance between the base plate 5 and the light source fixing device 6. When the second axis adjustment device 4 is rotated, the arm 41 moves in the base plate 5 along an axis parallel to the light source fixing device 6. Therefore not only can the distance between the light guide plate and the light source be varied, but also a selected deviation as between the light guide plate and the light source can be obtained.

The light source fixing device 6 has a light source space 61 for receiving the light source. The space 61 includes an opening (not labeled) at an extremity thereof nearest the base plate 5, for illumination of the light guide plate. The light source fixing device 6 further comprises a shaft 7 movably engaged through a length of the fixing device 6. The shaft 7 attaches the light source fixing device 6 to corresponding opposite sidewalls 21, and serves as an axle that the light source fixing device 6 can rotate about.

When the shaft 7 is rotated, the light source fixing device 6 is rotated correspondingly. The light source is thereby raised or lowered to selected different planes. The light emitted by the light source passes through the opening and illuminates the light guide plate on the base plate 5. Therefore the condition of oblique incidence of light can be imitated.

Figure 2:
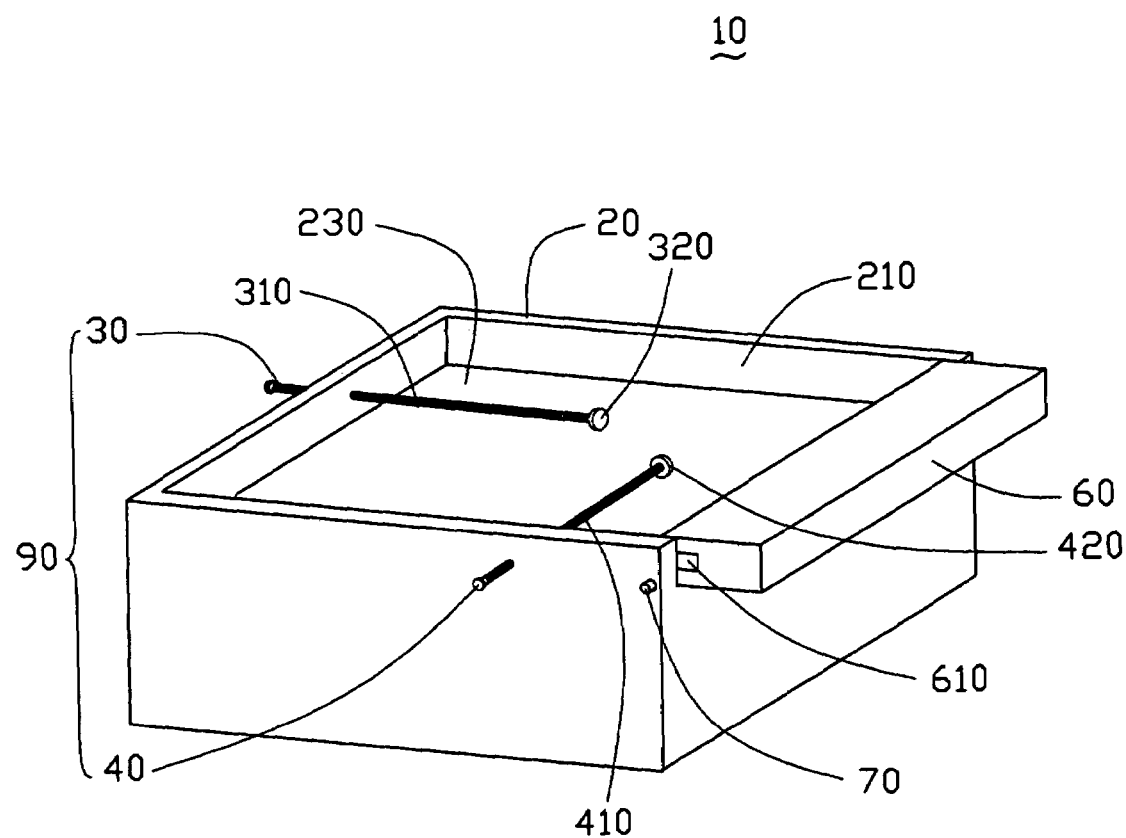
FIG. 2 is an isometric view of a light guide plate measurement apparatus according to a second embodiment of the present invention.

Referring to FIG. 2, a light guide plate measurement apparatus 10 according to a second embodiment of the present invention comprises a setting frame 20, a controlling device 90 disposed in the setting frame 20 for moving a light guide plate to be tested, and a light source fixing device 60 disposed at a side of the setting frame 20. The light source fixing device 60 contains a light source.

The setting frame 20 comprises four side walls 210, and a cavity 230 cooperatively defined by the side walls 210. The controlling device 90 comprises a first axis adjustment device 30, and a second axis adjustment device 40. The two adjustment devices 30, 40 respectively comprise a first arm 310 and a first bulge 320, and a second arm 410 and a second bulge 420. The light source fixing device 6 comprises a light source space 610 and a shaft 70.

The light guide plate measurement apparatus 10 does not use a base plate for placement of the light guide plate to be tested. Instead, the light guide plate is located in the cavity 230, and the light guide plate is moved by operating the controlling device. Therefore the light guide plate measurement apparatus 10 is simpler than the light guide plate measurement apparatus 1 of the first embodiment. In other aspects, the light guide plate measurement apparatus 10 is substantially the same as the light guide plate measurement apparatus 1, hence enjoys similar features and advantages.

Figure 3:
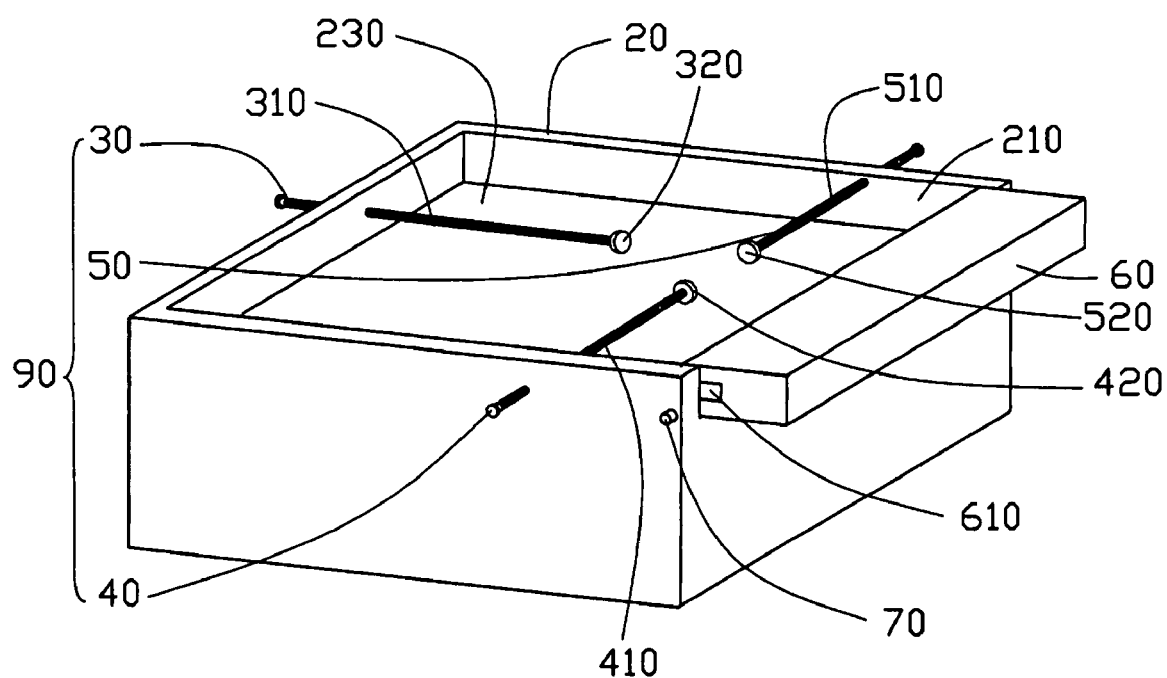
FIG. 3 is an isometric view of a light guide plate measurement apparatus according to a third embodiment of the present invention.

Referring to FIG. 3, a light guide plate measurement apparatus 20 according to a third embodiment of the present invention has an unique controlling device 90. The controlling device 90 comprises a first axis adjustment device 30, a second axis adjustment device 40, and a third direction adjustment device 50. The third direction adjustment device 50 comprises a third arm 510 and a third bulge 520, which are respectively opposite to the second arm 410 and the second bulge 420. The three adjustment devices 30, 40, 50 cooperate to fix a light guide plate to be tested. Unlike in the light guide plate measurement apparatus 10 of the second embodiment, so the provision of the third direction adjustment device 50 helps assure accurate positioning of the light guide plate.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A light guide plate measurement apparatus, comprising:
a setting frame;
a light source fixing device, comprising a space for receiving a light source and a shaft; and
a controlling device disposed on the setting frame for moving a light guide plate to be tested, the controlling device comprising a first axis adjustment device and a second axis adjustment device, the first axis adjustment device comprising a first arm, the second axis adjustment device comprising a second arm, the arms being perpendicular to each other, and each of the arms having a bulge at one end thereof;
wherein the light source fixing device connects with the setting frame through the shaft, and is rotatable about the shaft.

2. The light guide plate measurement apparatus as claimed in claim 1, wherein the setting frame comprises side walls and a cavity defined by the sidewalls, for placement therein of the light guide plate to be tested.

3. The light guide plate measurement apparatus as claimed in claim 2, wherein the first arm and the second arm are disposed through corresponding sidewalls and in the cavity, for moving of the light guide plate to be tested via the bulges of the arms.

4. A light guide plate measurement apparatus, comprising:
a setting frame;
a light source fixing device comprising a space for receiving a light source and a shaft;
a base plate for placing a light guide plate to be tested thereon; and
a controlling device disposed on the setting frame for moving the light guide plate to be tested, the controlling device comprising a first axis adjustment device and a second axis adjustment device, the first axis adjustment device comprising a first arm, the second axis adjustment device comprsing a second arm, the arms being perpendicular to each other;
wherein the light source fixing device connects with the setting frame through the shaft, and is rotatable about the shaft.

5. The light guide plate measurement apparatus as claimed in claim 4, wherein the setting frame comprises sidewalls and a cavity defined by the sidewalls.

6. The light guide plate measurement apparatus as claimed in claim 5, wherein the first arm and the second arm are disposed through corresponding sidewalls and in the cavity for moving of the base plate.

7. The light guide plate measurement apparatus as claimed in claim 6, wherein the base plate defines two grooves at two adjacent sides thereof, the arms each comprise a bulge, and the bulges are received in the grooves respectively.

8. A light guide plate measurement apparatus, comprising:
a setting frame;
a light source fixing device comprising a space for receiving a light source and a shaft; and
a controlling device disposed on the setting frame for moving a light guide plate to be tested, the controlling device comprising a first axis adjustment device, a second axis adjustment device, and a third adjustment device, the first axis adjustment device comprising a first arm, the second axis adjustment device comprising a second arm, the third adjustment device comprising a third arm opposite to the second arm, the first arm being perpendicular to the other two arms, and each of the arms having a bulge at one end thereof;
wherein the light source fixing device connects with the setting frame through the shaft, and is rotatable about the shaft.

9. The light guide plate measurement apparatus as claimed in claim 8, wherein the setting frame comprises side walls and a cavity defined by the sidewalls, for placement therein of the light guide plate to be tested.

10. The light guide plate measurement apparatus as claimed in claim 9, wherein the arms are disposed through corresponding sidewalk and in the cavity, for positioning of the light guide plate to be tested via the bulges of the arms.

\* \* \* \* \*